United States Patent

[11] 3,631,815

[72] Inventors James C. Heap
Munster;
Laurence J. Schlink, Griffith, both of Ind.
[21] Appl. No. 876,737
[22] Filed Nov. 14, 1969
[45] Patented Jan. 4, 1972
[73] Assignee Union Tank Car Company
Chicago, Ill.

[54] RAILWAY TANK CAR BOLSTER
11 Claims, 16 Drawing Figs.
[52] U.S. Cl. .................................................... 105/358,
105/226, 105/362, 280/5
[51] Int. Cl. ...................................................... B61d 5/06,
B61f 1/00, B61f 1/14
[50] Field of Search ........................................... 105/226,
358, 360, 362; 280/5

[56] References Cited
UNITED STATES PATENTS
2,078,939 5/1937 Ferguson ....................... 280/5

| 3,252,431 | 5/1966 | Phillips | 105/360 |
| 3,277,843 | 10/1966 | Horner et al. | 105/360 |
| 3,336,879 | 8/1967 | Halcomb | 105/360 X |
| 3,339,499 | 9/1967 | Charles et al. | 105/360 X |
| 3,470,829 | 10/1969 | Szala | 105/362 X |

Primary Examiner—Arthur L. La Point
Assistant Examiner—Howard Beltran
Attorney—Hume, Clement, Hume & Lee ABSTRACT: A tank bolster construction including an outer body bolster structure underlying the tank at each truck centerline. This outer body bolster structure is shallow in configuration so as to accommodate wheel trucks which might normally be expected to interfere. The outer bolster cooperates with a ring bolster extending around the tank at the truck centerline to dissipate stress at this point. At opposite ends of a stub sill, bolster partial ring structures effectively dissipate stress induced by eccentric loads acting on the stub sill, particularly in the instance where the tank car employs span bolster truck assemblies.

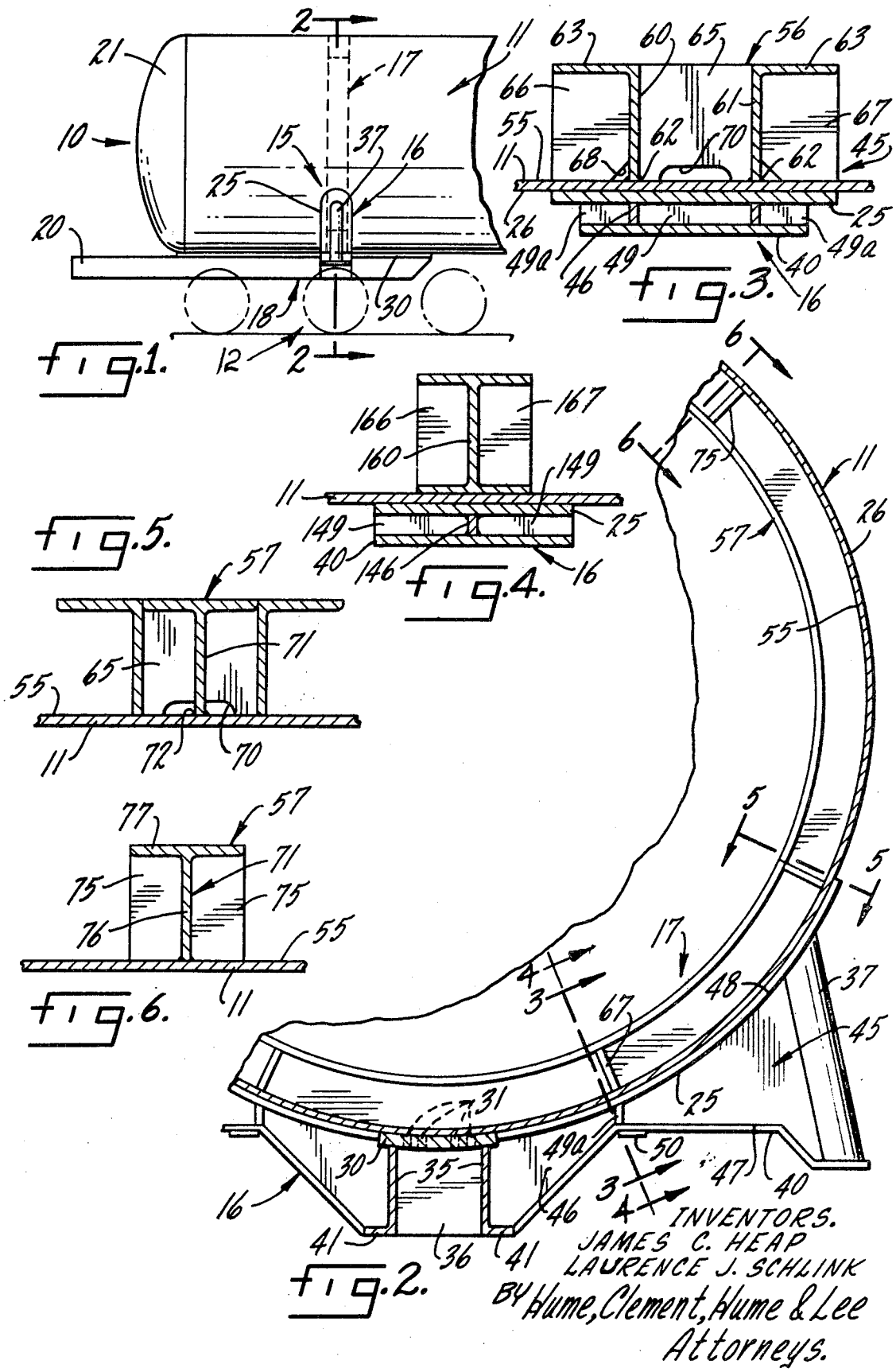

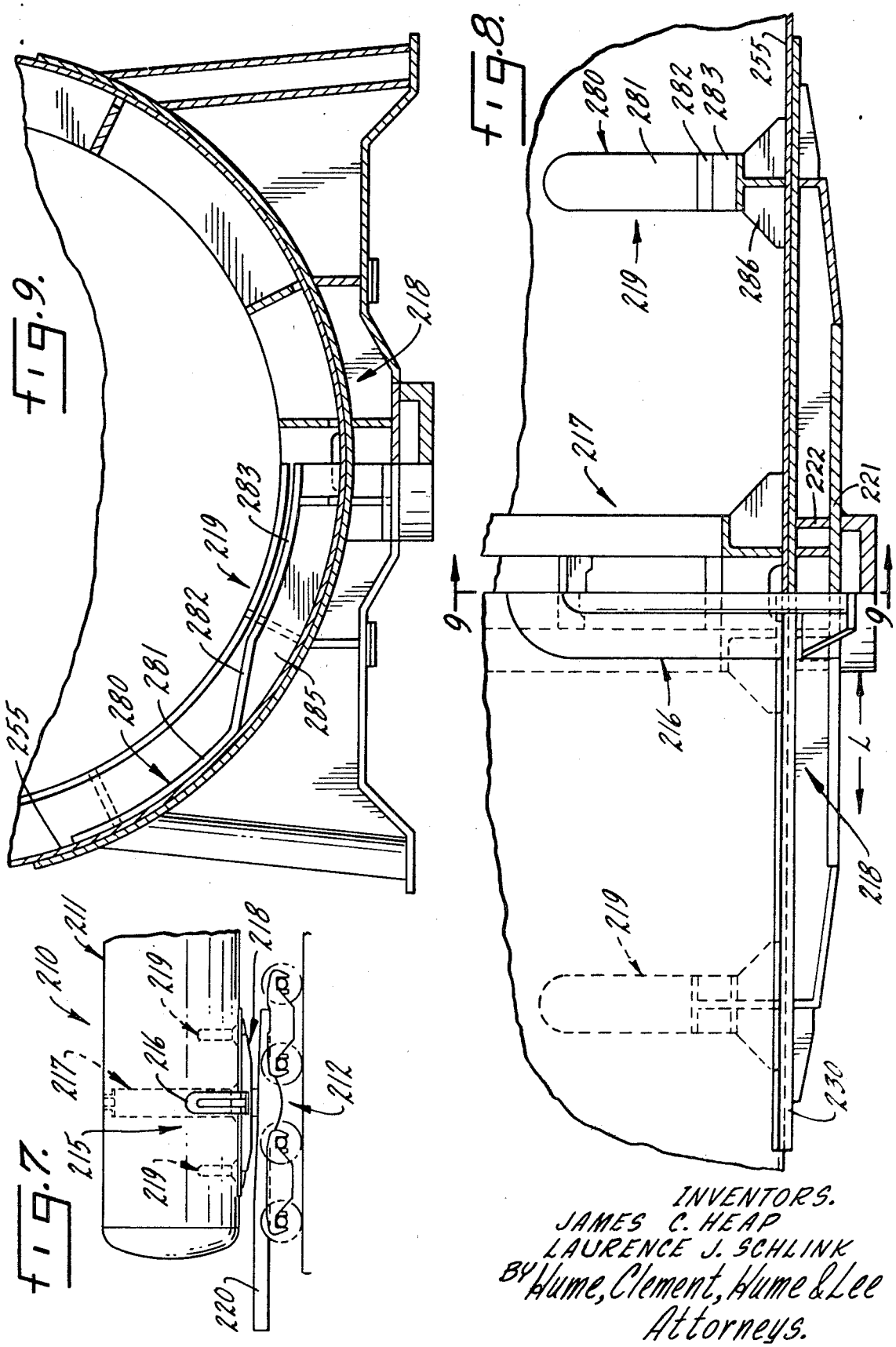

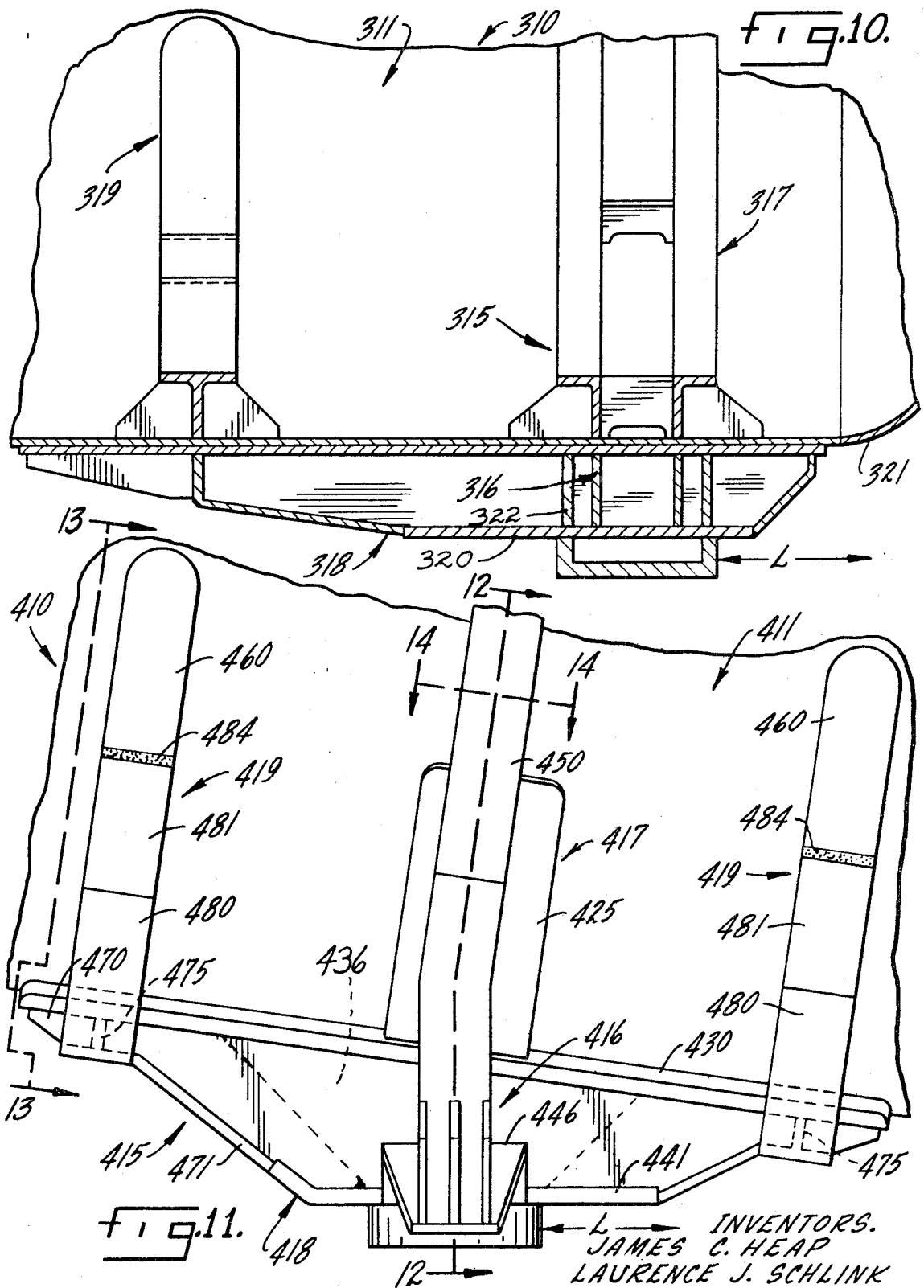

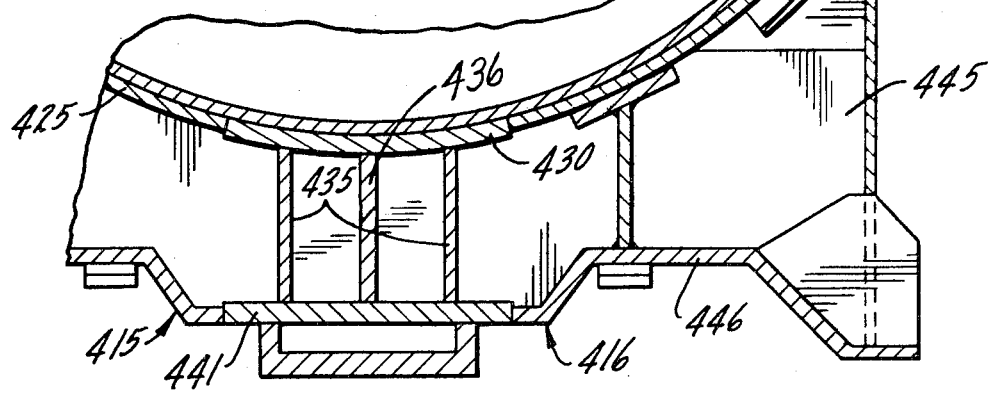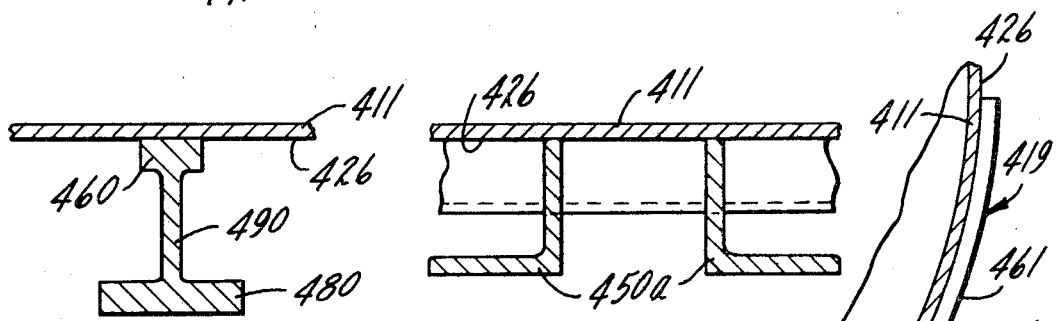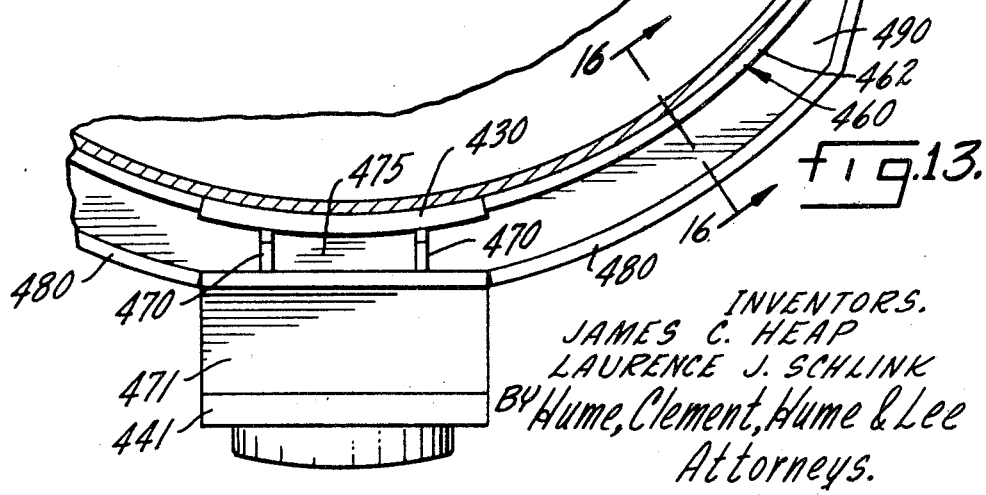

RAILWAY TANK CAR BOLSTER

BACKGROUND OF THE INVENTION

This invention is generally in the field of railway tank cars. It deals more particularly with the structure through which the tank is supported from wheel trucks, including the tank bolster constructions.

When six-wheeled trucks, for example, are employed on conventional tank cars, it is necessary that the external tank bolster be modified to accommodate the truck configuration. With side bearing supports on the truck positioned normally, for example, interference between the truck and the external tank bolster occurs. The side bearing pads can be installed differently to avoid this interference but such an installation is not desirable.

Reducing the structural size of the outer tank bolster would obviate this interference, as might be expected. By doing so, however, overall bolster strength would be reduced below permissible limits. Accordingly, this is, in itself, an unacceptable solution. The tank profile could be raised. However, here height limits of the American Association of Railroads are encountered, and, in addition, a higher center of gravity aggravates rocking characteristics.

Adjunct to problems which arise in center bolster design and construction, where the center bolster is located away from the head of the tank in a stub sill tank car, a moment created by eccentric loading and relatively high-impact forces is transmitted to the opposite ends of the sill and tends to stress the tank shell both at the inner and the outer ends of the stub sill. This is of particular significance where span bolster truck assemblies are employed. In such case, of course, the eccentricity of the loading is magnified.

SUMMARY OF THE INVENTION

The present invention is embodied in a greatly improved bolster construction for a tank car. As such, it is an object of the invention to provide a bolster construction which permits the use of standard railway trucks without modification of the trucks. It is another object of the invention to provide a bolster construction which affords the equivalent or greater structural strength than found in existing bolster constructions. It is still another object to provide a bolster construction which affords greater clearance between standard six-wheel trucks, for example, and the outside tank bolsters, making more working space available. A further object is to provide a bolster construction which permits the use of special trucks and mounted equipment in space not previously available. Still another object of the invention is to provide a bolster construction which affords optimum distribution of stresses caused by eccentric loads; particularly in the case where a span bolster tank car assembly is used with two four-wheel trucks on a stub sill tank car.

The foregoing and other objects are realized in accord with the invention by providing a full ring bolster construction encircling the tank at the centerline of the wheel truck assembly. In one aspect of the invention, the full ring bolster construction includes an outer bolster structure of substantially reduced size in combination with a full inner ring bolster structure i.e., inside-outside bolster. The ring bolster structure within the tank is constructed of angle members braced by annularly spaced, longitudinally extending load distribution stiffener and/or tie plates, the effect of which is to broaden the bolster base on the tank wall and aid in distributing stresses longitudinally as well as circumferentially of the tank.

Stresses which might normally be developed in the tank wall at opposite ends of a stub sill, particularly where span bolster truck assemblies are employed, for example, are further reduced by partial ring assemblies at the inner and outer ends of the stub sill. The partial ring assemblies might be internal or external structures which distribute stress caused by eccentric loads acting on the stub sill. In tank car constructions where the center tank bolster is immediately adjacent the end wall of a tank, the domelike end wall and bolster serve to distribute this eccentric loading from the outer end of the stub sill of the tank.

The invention, together with its organization and method of operation, taken with other objects and advantages thereof, is illustrated more or less diagrammatically in the drawings, in which:

FIG. 1 is a partial side elevational view of a stub sill tank car having six-wheel trucks and incorporating bolster constructions embodying features of the invention;

FIG. 2 is a sectional view taken along line 2—2 of FIG 1, with parts removed;

FIG. 3 is a sectional view taken along line 3—3 of FIG. 2;

FIG. 4 is a sectional view taken through a modified form of bolster construction to that illustrated in FIG. 3.

FIG. 5 is a sectional view taken along line 5—5 of FIG. 2;

FIG. 6 is a sectional view taken along line 6—6 of FIG. 2;

FIG. 7 is a partial side elevational view, similar to FIG. 1, showing a tank car utilizing span bolster truck assemblies and incorporating bolster constructions embodying features of a first alternate form of the invention;

FIG. 8 is an enlarged side elevational view, partially in section, of the bolster construction illustrated in FIG. 7;

FIG. 9 is a split sectional view taken along line 9—9 of FIG. 8;

FIG. 10 is an enlarged side sectional view of a second alternate form of the bolster construction;

FIG. 11 is an enlarged side elevational view of a third alternate form of the bolster construction;

FIG. 12 is a sectional view taken along line 12—12 of FIG. 11;

FIG. 13 is a sectional view taken along line 13—13 of FIG. 11;

FIG. 14 is a sectional view taken along line 14—14 of FIG. 11;

FIG. 15 is a sectional view taken through a modified form of bolster construction to that illustrated in FIG. 14; and FIG. 16 is a sectional view taken along line 16—16 of FIG. 13.

DESCRIPTION OF THE PREFERRED EMBODIMENTS

Referring now to the drawings, and particularly to FIG. 1, one end of a stub sill tank car is illustrated generally at 10. The tank car 10 includes a cylindrical tank 11 supported at each end (only one shown) by a conventional six-wheel truck assembly 12.

The six-wheel truck assembly 12 supports the tank 11 through a tank bolster construction 15 embodying features of the present invention. The tank bolster construction 15 includes an outer bolster structure 16 which cooperates with an inner bolster structure 17 and a stub sill 18 to support the tank 11 from the truck assembly 12 according to the invention providing, in effect, an inside-outside bolster construction. The stub sill 18 has, as will be noted, a draft arm 20 extending outwardly from the end cap 21 of the tank 11 in a well-known manner.

The outer tank bolster structure 16 and the cooperating inner tank bolster structure 17 serve to distribute stresses normally effected in the cylindrical tank at the truck assembly 12 centerline by static and dynamic load factors to which the tank car 10 is subjected. At least this same stress capacity is realized even though the outer bolster structure 16 is substantially reduced in mass over conventional center bolster constructions. The reduction in outer bolster structure size, which necessarily reduces its strength, permits the use of the standard six-wheel truck assemblies 12, for example, without repositioning of the bearing pads on the outer bolster substructure 16 from their normal spacing from the tank centerline. Desired spacing between the truck bolster and the tank bolster structure 16 afforded while overall center tank bolster strength is actually increased and the tank itself is not raised.

Referring now to FIG. 2, as well as to FIG. 1, the outer bolster structure 16 is seen to comprise a saddle plate 25 welded to the outer surface 26 of the tank 11. The saddle plate 25, which is actually formed in two half sections, is welded at its inner ends to the stub sill 18 center reinforcement plate 30.

The center reinforcement plate 30 is welded to the outer surface 26 of the tank 11 at the bottom of the tank on its centerline. According to the invention, the plate 30 is welded to the surface 26 through a series of longitudinally extending weld slots 31 formed in the plate 30 on opposite sides of the center bolster construction 15. Circumferentially extending slots in the center reinforcement plate 30 adjacent opposite ends of the stub sill 18 also afford weldment locations.

The stub sill 18 further includes longitudinally extending stiffener members (Zee Car Building sections which are cut off under the tank to give shown angle shape) 35 welded at their upper ends to the longitudinally extending edges of the center reinforcement plate 30 and depending therefrom. A longitudinally spaced series of transverse tie plates 36 are welded to and interconnect these members 35.

Disposed opposite each of the Zee members 35 in the stub sill 18 and defining the outermost extremities of the tank outer bolster structure 16 on the opposite sides of the sill 18 are inwardly inclined bolster pipes 37 (only one shown). Each bolster pipe 37 is welded on a bias at its upper end to the outer surface of the corresponding side of the saddle plate 25. At its lower end, each bolster pipe 37 is, in turn, welded to the upper surface of the stepped, bolster cover plate 40. Each plate 40 is, in turn, welded at its innermost end to the lower flange 41 of a corresponding Zee member 35 in the stub sill 18.

One form of the bolster 45 configuration which is employed, according to the invention, is illustrated in FIG. 3. The double web 45 is separated into two segments by the sill 18, and each comprises a pair of longitudinally spaced web plates 46 which extend, at their lower edges 47 along the upper surface of the corresponding cover plate 40, and at their upper edges 48 along a substantial portion of the annular outer surface of the saddle plates 25. The web plates 46 are welded to the cover and saddle plates along the aforementioned edges. A tie plate 49 is welded between each of these web plates and bracketing stiffener plates 49a are welded outside each web plate between the saddle plate 25 and the floor plate 40.

As will be noted, the outer bolster structure 16 is relatively shallow at the tie plates 49, where the conventional bearings pads 50 (only one shown) are located. This shallow configuration of the outer bolster structure 16 over the wheels and truck bolster permits of a lower tank profile and affords space between the truck bolster, truck center wheels, and the outer tank bolster structure 16. Nevertheless, this shallow configuration does not detract from the overall strength of the tank bolster construction 15 at the truck centerline because of the cooperating effect of the inner bolster structure 17.

The inner bolster structure 17 in the tank car 11 illustrated in FIGS. 1–3 is a continuous annular ring, unitary in construction, which extends around the entire inner surface 55 of the tank 11 and includes a lower section 56 and an upper section 57. One form of the lower section 56 construction is seen in cross section in FIG. 3 while a corresponding upper section 57 construction is seen in cross section in FIGS. 5 and 6.

The lower section 56 of the annular inner ring comprises a pair of longitudinally spaced angle members 60 and 61 welded at their outer edges 62 to the inner surface 55 of the tank 11. The flanges 63 of the angle members extend longitudinally of the tank 11 concentric with the axis of the tank, as will be recognized.

At four spaced intervals (only three shown) along the annular length of the lower ring section 56, the angle members 60 and 61 are joined by generally rectangular tie plates 65 welded between them. At the two lowermost tie plates 65, in alignment with the outside plates 49, side bearing stiffener plates 66 and 67 are welded between corresponding flanges 63 and the inner surface 55 of the tank 11. To facilitate cleaning the lower ring section at its juncture with the surface 55 of the tank 11, cutouts 70 are provided in the base of each tie plate 65 and cutouts 68 are provided in the stiffener plates 66 and 67.

The aforedescribed lower ring section 56 has a relatively wide base along its circumferential length, which extends substantially between the ends of the outer saddle plate 25. Approximately at the outer ends of the saddle plate 25 it joins and is welded to the lower ends of the upper ring section 57.

The upper ring section 57 includes a single Tee member 71 extending around the inner surface 55 of the tank 11 between the outer ends of the lower ring section 56. The outer edge of the Tee member 71 is welded to this inner surface 55 along its length, as at 72. The opposite ends of the Tee member 71 are, in turn, welded to corresponding tie plates 65 at opposite ends of the lower ring section 56.

Spaced around the upper ring section 57 in bracketing relationship with the Tee member 71 are a plurality of stiffener plates 75 (only one shown), best seen in FIG. 6. The stiffener plates 75 are welded to both the opposite sides of the upstanding leg 76 of the Tee member and the lower surface of the crossarm 77 of the Tee member, as well as to the surface 55 of the tank 11.

The inner bolster structure 17, formed of the relatively sturdier lower ring section 56 and the lighter upper ring section 57, provides effective stress capacity at the center of each truck assembly 12, where the highest stresses are normally developed by static and dynamic loading of the tank car 10. This is the case even though the outer bolster structure 16 is rather shallow. The flanged configuration and annularly spaced tie plates and stiffener plates of the lower ring section 56 provide a relatively broad base, as does the upper ring section 57. Accordingly, the entire inner bolster structure 17, with its collective relatively wide base, serves to more effectively distribute stresses at the tank 10 truck centerlines.

Complete outer and inner bolster structures 16 and 17 have been described in accord with features of the invention. The structures described provide, in effect, two primary advantages over prior art bolster constructions extant. First, the combination of an inner ring bolster structure 17 with an outer bolster structure 16 permits drastic reduction in the size of the outer bolster structure. Second, the combination of circumferentially extending angle members and annularly spaced, longitudinally extending stiffening plates and tie plates affords a broad base for the bolster structure 17 to effectively distribute stresses in the tank at the center bolster.

Although certain preferred forms of the outer and inner bolster structures 16 and 17 have been described, it should be pointed out that various modifications of the bolster structures, particularly the inner bolster structure 17, also provide the advantageous features of the invention. FIG. 4 is illustrative of one such modified inner bolster construction, for example.

FIG. 4 is a sectional view through a modified form of the outer bolster structure 16 and the lower ring section 56 of the inner bolster structure 17. As will be noted, the outer bolster structure 16 includes only a single-web plate 146 bracketed by stiffener plates 149. The web plate 146 and stiffener plates 149 are welded between the saddle plate 25 and the floor plate 40 in the manner hereinbefore discussed in relation to the outer bolster structure 16 illustrated in FIG. 3.

The cross section of the inner bolster structure at the line 4—4 in FIG. 2 is that of an H-beam 160 (Wide Flange beam or I-beam) having stiffener plates 166 and 167 welded in its opposed channels. Where the bolster structure of FIG. 4 is employed, preferably in smaller tank cars, the cross section of the upper ring section 57 preferably employed is that illustrated in FIG. 6 and hereinbefore discussed.

The cross sections of two different inner and outer structures have now been discussed. Many variations are possible within the purview of the invention, however. Those described are merely exemplary of the structures embodying the desired features.

Referring now to FIG. 7, another stub sill tank car is illustrated generally at 210. The tank car 210 includes a cylindrical tank 211 supported at each end (only one shown) by a conventional span bolster truck assembly 212.

The span bolster truck assembly 212 supports the tank 211 through a tank bolster construction 215 embodying features of a first alternate form of the present invention. The tank bolster construction 215 includes an outer bolster structure 216 cooperating with an inner bolster structure 217 and a stub sill 218 to support the tank 211 from the span bolster truck assembly 212 according to the invention. At opposite ends of the stub sill 218, partial internal ring bolsters 219 arranged according to the invention distribute stresses induced by eccentric loading of the tank car through the draft arm assembly 220 and the truck assembly 212, which connect to the car on the load line (L) displaced substantially below the bottom of the tank.

Referring to FIGS. 8 and 9, the stub sill and partial ring bolster 219 construction which, in combination with the cooperating center bolster structures 216 and 217, is effective to dissipate stresses created at the ends of the stub sill by eccentric loading without damage to the tank, is illustrated in substantial detail. The center bolster structures (outer and inner) 216 and 217 are constructed substantially as discussed in relation to corresponding structures 16 and 17 hereinbefore described. They are constructed, according to the invention, to serve the same ends, although the details of their construction, such as might be noted in the slightly greater depth of the outer bolster structure 216, might vary.

The stub sill 218, however, is not provided with a draft arm, as a result of utilizing a span bolster truck assembly. Since a span bolster truck assembly is used, the draft arm 220 is disposed on the truck assembly itself, and the draft load line (L) of the tank car 210 is along the draft arm. As will be recognized, the load line (L) is displaced a substantial distance below the level of the center reinforcement plate 230 in the stub sill 218.

The eccentricity of this loading, especially when the tank car 210 is subjected to endwise shocks while in a loaded condition, tends to pivot the stub sill 218 about its centerline over the center of the span bolster truck assembly 212. The cooperating outer and inner bolster structures 216 and 217 at the centerline assist in counteracting the stress developed by this tendency of the stub sill 218 to pivot. However, the bulk of these stresses are dissipated through the tank 211 by the bolster partial rings 219 mounted inside the tank 211 in alignment with opposite ends of the stub sill 218.

As seen best on the right side of FIG. 8 and the left side of FIG. 9, each bolster partial ring structure 219 includes a generally saddle-shaped plate 280 which engages the inner surface 225 of the tank 211 in flush, intimate relationship, along the outer sections 281 of the plate 280. The outer sections 281 of the plate 280 are, in fact, welded to this inner surface 255 of the tank 211.

At the inner end of each plate section 281, displaced outwardly of the centerline of the tank 211, the plate 280 is bent upwardly into an intermediate section 282 lying in a generally horizontal plane. At a height which is normally slightly less than the thickness of the ring sections 56 and 57 of the inner bolster structure 17, the plate 280 reverts to arcuate shape and extends across the bottom centerline of the tank 211 in this configuration, leaving a gap below the planar sections 282 and the arcuate section 283 and above the tank wall surface 255.

A circumferentially extending web plate 285 disposed perpendicular to the axis of the tank 211 is welded as a stiffener between the inner surface 255 of the tank wall and the sections 282 and 283 of the plate 280. In turn, as best seen in FIG. 8, longitudinally extending stiffener plates 286, generally triangular in configuration, are welded to the upstanding web plate 285, the inner surface 255 of the tank wall and the lower surface of the plate sections 282 and 283.

In FIG. 8, the two stiffeners 222 are on each side of the bolster webs and inserted in the stub sill 218 between the two vertical web plates. These stiffeners 222 help resist rotation of the bottom plate 221 due to eccentric loading along the load line (L).

When the tank car 210 is not subjected to draft load along the load line (L), the bolster partial ring structures 219 are not considered to carry vertical loads. When the tank car is drawn by the draft arm 220 on the truck assembly 212, however, the eccentric load effective on the tank through the stub sill 218 is dissipated through the tank wall 211 by the bolster partial ring structures 219, according to the invention. By static and dynamic tests, it has been determined that tank stresses at the sill 218 ends are reduced by about 50 percent.

Referring now to FIG. 10, an enlarged side elevational view, partially in section, of a portion of a tank car 310 is illustrated. The tank car 310 includes a cylindrical tank 311 supported at each end by a conventional span bolster truck assembly (not shown) similar to that discussed in relation to the tank car 210 hereinbefore described. In the tank car 310, each span bolster truck assembly supports the tank 311 through a tank bolster construction 315 embodying features of a second alternative form of the present invention.

The tank bolster construction 315 includes an outer bolster structure 316 cooperating with an inner bolster structure 317 and a stub sill 318 to support the tank 311 from the span bolster truck assembly (not shown) at the centerline of the truck assembly. In this form of the invention, however, the inner and outer bolster structures are disposed immediately adjacent the end cap 321 of the tank 311 and, accordingly, the stub sill 318 is shortened on the cap 321 side of the center inner and outer bolster structures 316 and 317. Again, two stiffeners 322 on each side of the bolster webs, welded to the inside of the stub sill 318, help prevent rotation of the bottom plate 320 due to eccentric loading along the load line (L).

A single partial ring structure 319 is mounted inside the tank 311 over the inner end of the stub sill 318. The partial ring bolster 319 is similar in construction and arrangement to the inner partial ring bolsters 219 hereinbefore discussed. Accordingly, the details of its construction are omitted.

In effect, the partial ring bolster 319 serves to distribute stress induced by eccentric loading along the load line (L) at the inner end of the stub sill 318. In turn, with the stub sill 318 terminating immediately adjacent the end cap 321, and the end cap 321 spaced at a lesser distance from the bolster construction 315 than the partial ring structure 319 (or an equal distance), the end cap and/or the tank bolster serve to dissipate stress induced at the outer end of the stub sill by this eccentric loading. Once again, a reduction in induced stress at the stub sill 318 ends is achieved by this simple and inexpensive construction.

Finally, referring to FIGS. 11-15, a third form of bolster construction embodying features of the present invention is illustrated at 415, on a center drain tank car 410. The bolster construction 415 is mounted externally of the tank 411 and, similar to the tanks 210 and 310, is adapted to mount on a span bolster truck assembly (not shown).

The bolster construction 415 includes a lower outer center bolster structure 416 which cooperates with a tank encircling upper bolster structures 417, the external counterpart of the inner bolster structures 217 and 317 hereinbefore discussed. These bolster structures 416 and 417 are based in a suitably inclined stub sill 418 which mounts, at its opposite ends, external partial ring bolsters 419.

The lower bolster structure 416 depends from and is welded to the saddle plate 425 underlying the tank wall 426 in a well-known manner. A center reinforcement plate 430 extends along the length of the stub sill 418 and is welded to the car wall 426 along its length. The stub sill 418 is, in turn, fabricated of longitudinally extending, vertically disposed, steel plates 435 welded to and depending from the plate 430 and, in turn, welded at their lower ends to a stub sill footing plate 441.

Bolster webs 445 of a generally conventional construction bracket the stub sill 418, are welded to corresponding saddle plate section 425 and floor plate sections 446, and, in turn, to the upper outer bolster structure 417. The upper outer bolster structure 417 ordinarily comprises an annular channel member 450 welded to the outer surface of the tank 426 around its circumference, as seen in FIG. 14. Where a tank car with outside heater coils is employed, however, it preferably comprises opposed angle members 450a, as seen in FIG. 15. The channel member 450 is complementary with and welded to the outer ends of the saddle plate sections 425, as well as to the bolster webs 445.

The external bolster partial ring structures 419 are identical in construction. They are best illustrated in FIGS. 11, 13 and 16. As seen in FIG. 13, each comprises a saddle plate 460 underlying and welded to the outer surface of the tank wall 426. The saddle plate actually comprises a pair of outer segments 461 (only one shown) and a pair of inner segments 462 (only one shown). The inner segments 462 are welded, at their innermost ends, to a center reinforcement plate 430 extending the length of the stub sill 418.

The stub sill 418, as it extends fore and aft of the center bolster structures 416 and 417, comprises horizontally extending, vertically disposed web plates 470 in spaced relationship. The web plates 470 are welded to and depend from the center reinforcement plate 430. The web plates 470, in turn, terminate at lower edges welded to the stub sill footing plate extensions 471. Transversely extending tie plates 475 are welded between the web plates 470 at the bolster partial ring structures 419 in the manner illustrated in FIG. 11. Other tie plates (not shown) might also be provided between the web plates 470 along the length of the stub sill 418.

A load distribution gusset 436 (see FIGS. 11 and 12) at the center of the stub sill and parallel to the side webs replaced the two stiffeners in former designs. The gusset 436 helps resist rotation of the bottom plate 418 and, additionally, provides shear resistance due to eccentric loading along the load line (L). The gusset 436 may be as shown in FIG. 11 or have a full profile similar to the parallel webs 435.

Partial ring bolster floor plates 480 are welded to opposite sides of the stub sill footing plate extension 471 and curve upwardly in uniformly spaced relationship from the saddle plate 460. At a point approximately halfway up each side of the saddle plate 460, these floor plates 480 bend upwardly into upper sections 481 (only one shown) which are welded to the outer surface of a corresponding saddle plate segment 461, and at 484.

A transversely extending, vertically disposed web 490 is disposed between the floor plate 480, saddle plate 460. In practice, the floor plate 480, saddle plate 460, and web 490 might be fabricated in one piece from a modified I, H, or Wide Flange member, as illustrated in FIG. 16. On the other hand, the partial ring bolster structures 419 might be entirely fabricated of plate.

Regardless, the partial ring bolsters 419 serve to effectively dissipate stress induced by eccentric loading along the load line (L) of the stub sill male center plate in the manner hereinbefore discussed in relation to other alternative forms of the present invention. The center bolster structures 416 and 417 also serve the same functions hereinbefore attributed to and discussed in relation to these alternative forms.

While several embodiments described herein at present are considered to be preferred, it is understood that various modifications and improvements may be made therein.

What is desired to be claimed and secured by Letters Patent of United States is:

1. In a railway tank car having a truck assembly supporting the car tank through a tank bolster construction and sill, the improvement in tank bolster construction, comprising:
   a. outer bolster structure means extending transversely of said tank in underlying relationship at a tank truck centerline, and
   b. other bolster structure means extending annularly around the entire tank,
   c. said other bolster structure means being unitary in construction and secured to said tank in longitudinal alignment with said outer bolster structure means,
   d. said outer and other bolster structure means cooperating to dissipate stresses effected at the truck centerline by static and dynamic tank loads.

2. The improvement in tank bolster construction of claim 1 further characterized in that:
   a. said other bolster means includes annular ring means extending round the inside of said tank,
   b. said ring means including first annular member means disposed generally in a plane perpendicular to the axis of the tank and second annular member means disposed generally normal to said first annular member means.

3. The improvement in tank bolster construction of claim 2 further characterized by and including:
   a. a plurality of stiffening means spaced around the circumference of said tank and stiffening said annular ring means longitudinally of said tank as well as providing a relatively broad base for said ring means on the tank wall.

4. The improvement in tank bolster construction of claim 2 further characterized in that:
   a. said annular inner ring means includes an upper section and a lower section,
   b. said lower section extending generally coextensive with said outer bolster structure means and comprising relatively heavy members,
   c. said upper section extending around the remainder of said tank and comprising relatively light members.

5. The improvement in tank bolster construction of claim 4 further characterized in that:
   a. said lower ring section comprises a pair of spaced flange members,
   b. said flange members being interconnected by annularly spaced series of tie plates.

6. The improvement in tank bolster construction of claim 1 further characterized in that:
   a. said other bolster means includes annular ring means extending around the outside of said tank,
   b. said annular ring means including first annular member means disposed in a plane perpendicular to the axis of said tank and second annular member means disposed normal to said first annular member means.

7. The improvement in tank bolster construction of claim 6 further characterized in that:
   a. said annular ring means comprises a channel member having its free edges welded to the outer surface of said tank.

8. In a railway tank car having a truck assembly supporting the car tank through a tank bolster construction and a stub sill, the improvement in tank bolster construction, comprising:
   a. outer bolster structure means extending transversely of said tank in underlying relationship at a tank truck centerline,
   b. other bolster structure means extending annularly around the entire tank,
   c. said other bolster structure means being unitary in construction and secured to said tank in longitudinal alignment with said outer bolster structure means,
   d. said outer and other bolster structure means cooperating to dissipate stresses effected at the truck centerline by static and dynamic tank loads, and
   e. means disposed at at least the innermost end of said stub sill for dissipating stresses induced by eccentric loading of the tank car through said stub sill,
   f. said stress dissipating means comprising a partial ring structure mounted on said tank and extending a portion of the way up each side of the tank.

9. The improvement in tank bolster construction of claim 8 further characterized by and including:
   a. stress dissipating means disposed at both the innermost and outermost end of said stub sill.

10. The improvement in tank bolster construction of claim 8 further characterized in that:
    a. said partial ring structure includes a generally arcuate saddle plate means welded at its opposite ends to the sides of said tank, b. and web means disposed between said saddle plate means and the wall of said tank.

11. The improvement in tank bolster construction of claim 8 further characterized in that:
   a. the tank of said railway tank car includes an end cap which acts as a structural support member for the tank itself,
   b. said outer and other bolster structure means being spaced a predetermined distance from said end cap equal to or less than the distance between said outer and other bolster structure means and said means disposed at the innermost end of said stub sill for dissipating stresses induced by eccentric loading of the tank car through said stub sill.

* * * * *